US009714505B2

(12) United States Patent
Kim et al.

(10) Patent No.: US 9,714,505 B2
(45) Date of Patent: Jul. 25, 2017

(54) GARBAGE DISPOSAL UNIT

(71) Applicant: LG ELECTRONICS INC., Seoul (KR)

(72) Inventors: Sungmin Kim, Seoul (KR); Daeyun Park, Seoul (KR); Jeongyun Kim, Seoul (KR)

(73) Assignee: LG Electronics Inc., Seoul (KR)

(*) Notice: Subject to any disclaimer, the term of this patent is extended or adjusted under 35 U.S.C. 154(b) by 195 days.

(21) Appl. No.: 14/753,263

(22) Filed: Jun. 29, 2015

(65) Prior Publication Data

US 2016/0002901 A1 Jan. 7, 2016

(30) Foreign Application Priority Data

Jul. 1, 2014 (KR) ........................ 10-2014-0081722

(51) Int. Cl.

*B02C 23/36* (2006.01)
*E03C 1/266* (2006.01)

(Continued)

(52) U.S. Cl.

CPC ........ *E03C 1/2665* (2013.01); *B02C 18/0092* (2013.01); *B02C 18/2216* (2013.01); *B02C 23/20* (2013.01); *B02C 23/36* (2013.01); *B09B 3/00* (2013.01); *F26B 11/04* (2013.01); *F26B 11/08* (2013.01); *F26B 2200/18* (2013.01)

(58) Field of Classification Search

None

See application file for complete search history.

(56) References Cited

U.S. PATENT DOCUMENTS 5,622,617 A 4/1997 Tsusaka
7,954,739 B2 * 6/2011 Shin-Ya .............. B02C 18/0084 241/100

(Continued)

FOREIGN PATENT DOCUMENTS

CN 101925419 12/2010
CN 203400920 1/2014

(Continued)

OTHER PUBLICATIONS

European Search Report dated Sep. 8, 2015 for Application No. 15173780.6, 7 pages.

(Continued)

*Primary Examiner* — Mark Rosenbaum
(74) *Attorney, Agent, or Firm* — Fish & Richardson P.C.

(57) ABSTRACT

A garbage disposal unit is disclosed. The garbage disposal unit includes a cabinet. The garbage disposal unit further includes a crushing unit that is located in the cabinet and that is configured to crush garbage. The garbage disposal unit further includes a housing body that is located in the cabinet. The garbage disposal unit further includes an inlet port that is configured to guide garbage discharged from the crushing unit to the housing body. The garbage disposal unit further includes an outlet port that is configured to connect an inside of the housing body to an inside of the cabinet. The garbage disposal unit further includes a dehydration unit that is located in the housing body and that is configured to dehydrate and agitate garbage by rotating. The garbage disposal unit further includes an agitation unit.

21 Claims, 13 Drawing Sheets

(51) Int. Cl.

| | |
|---|---|
| ***B09B 3/00*** | (2006.01) |
| ***B02C 18/00*** | (2006.01) |
| ***B02C 23/20*** | (2006.01) |
| ***F26B 11/08*** | (2006.01) |
| ***B02C 18/22*** | (2006.01) |
| ***F26B 11/04*** | (2006.01) |

(56) References Cited

U.S. PATENT DOCUMENTS

| | | | | |
|---|---|---|---|---|
| 2002/0096459 | A1 | 7/2002 | Suzuki | |
| 2015/0231639 | A1* | 8/2015 | Kim .................... | B02C 18/0092 241/60 |

FOREIGN PATENT DOCUMENTS

| | | | |
|---|---|---|---|
| CN | 203556628 | | 4/2014 |
| GB | 2286825 | | 8/1995 |
| JP | H 02-090953 | A | 3/1990 |
| JP | 11-019629 | | 1/1999 |
| JP | 2002-011446 | | 1/2002 |
| JP | 2003-053314 | A | 2/2003 |
| JP | 2003-285029 | | 10/2003 |
| JP | 2005-021734 | A | 1/2005 |
| JP | 2006-239571 | | 9/2006 |
| JP | 2006-322686 | A | 11/2006 |
| JP | 2011-115716 | A | 6/2011 |
| JP | 5165902 | | 3/2013 |
| KR | 10-0832914 | | 5/2008 |
| KR | 10-2008-0113686 | A | 12/2008 |
| KR | 10-0926837 | | 11/2009 |
| KR | 10-1298665 | | 8/2013 |
| KR | 10-2014-0036486 | A | 3/2014 |
| WO | WO 2007/079968 | A3 | 6/2008 |

OTHER PUBLICATIONS

Chinese Office Action in Chinese Application No. 201510362333.3, dated Apr. 1, 2017, 10 pages (with English translation).

* cited by examiner

FIG. 4(a)
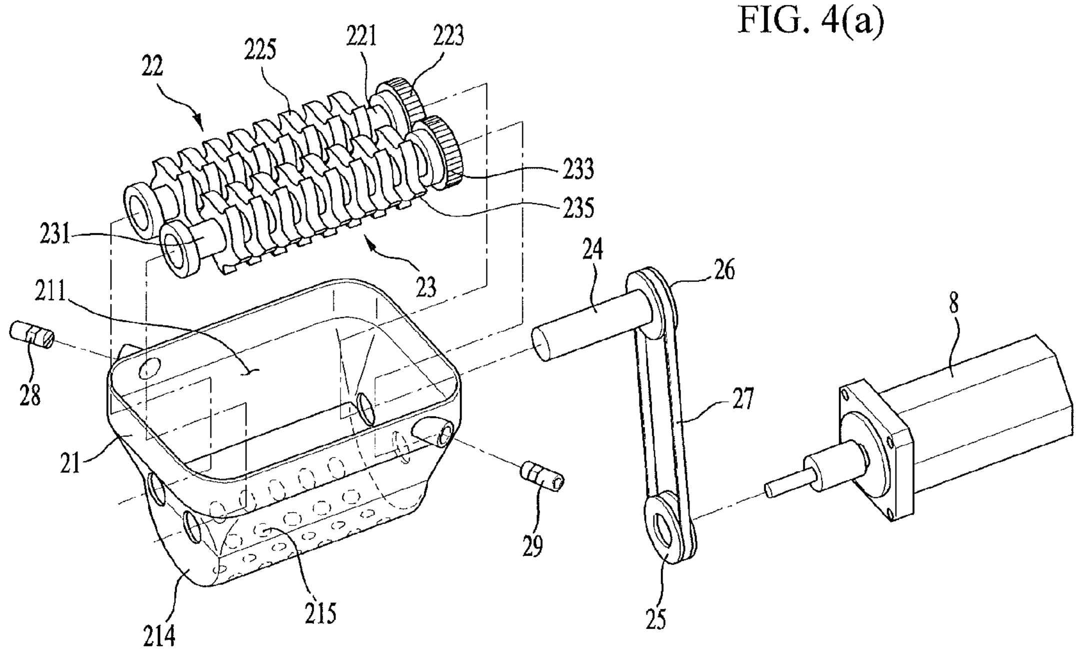
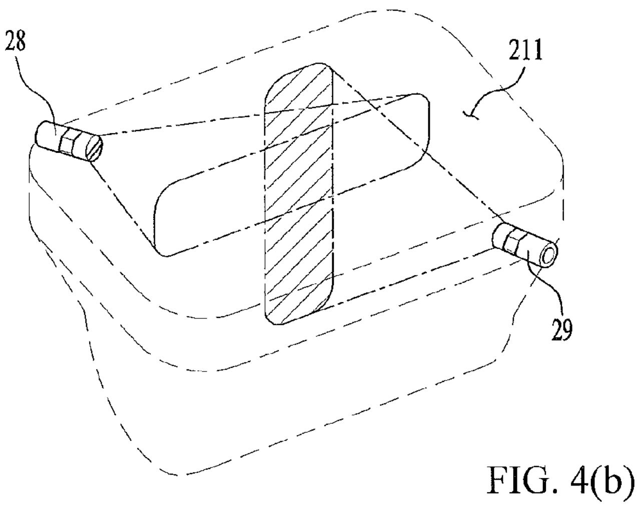
FIG. 4(b)

GARBAGE DISPOSAL UNIT

CROSS REFERENCE TO RELATED APPLICATION

This application claims the benefit of Korean Patent Application No. 10-2014-0081722, filed on Jul. 1, 2014, which is hereby incorporated by reference as if fully set forth herein.

FIELD

The present invention relates to a garbage disposal unit.

BACKGROUND

Among methods to dispose of garbage generated from kitchens, one method is carried out in such a fashion as to provide a sink outlet of a sink cabinet with a crushing device, to crush garbage discharged from the sink outlet, and to discharge the garbage through a sewage line. In other words, this method is carried out in such a manner as to introduce garbage together with water to a sink outlet of a sink cabinet, to finely crush garbage by cutters of the crushing device, and to discharge the garbage together with waste water to a sewage line.

SUMMARY

According to an innovative aspect of the subject matter described in this application, a garbage disposal unit includes a cabinet; a crushing unit that is located in the cabinet and that is configured to crush garbage; a housing body that is located in the cabinet; an inlet port that is configured to guide garbage discharged from the crushing unit to the housing body; an outlet port that is configured to connect an inside of the housing body to an inside of the cabinet; a dehydration unit that is located in the housing body and that is configured to dehydrate and agitate garbage by rotating, the dehydration unit including (i) a storage body that is located in the housing, that is configured to store garbage, and that defines a communication hole that is configured to connect with the inlet port or the outlet port based on a rotational angle of the storage body and (ii) a rotating shaft that is configured to be oriented parallel to ground upon proper installation and that is configured to rotatably support the storage body and the housing body; and an agitation unit that is configured to rotate in the storage body and configured to open and close the communication hole.

The garbage disposal unit may include one or more of the following optional features. The garbage disposal unit includes a driving unit that is configured to rotate the agitation unit in a clockwise direction and a counterclockwise direction. The dehydration unit rotates together with the agitation unit based on the agitation unit rotating in one of the clockwise direction and the counterclockwise direction. The rotating shaft includes a shaft body that extends through the housing body, that is configured to rotate in the housing body, and that defines a shaft through hole. The agitation unit includes an agitator rotating shaft that is located in the shaft through hole and that is connected to the driving unit. The garbage disposal unit further comprises a power transmission unit that is located in the shaft through hole, that is configured to support the agitator rotating shaft, and that is configured to transmit one of a clockwise rotational force and a counterclockwise rotational force supplied by the agitator rotating shaft to the shaft body.

The garbage disposal unit includes a lock that is configured to prevent rotation of the shaft body and rotation of the dehydration unit. The lock includes a first engaging part that is located at the shaft body; and a second engaging part that is rotatably located at the housing body and that is configured to engage with the first engaging part. The garbage disposal unit includes a first position detector that is configured to detect a position of the communication hole; and a second position detector that is configured to detect a position of the agitation unit. The first position detector includes a first magnetic member that is fixed to the shaft body; a first sensor that is configured to determine whether the communication hole communicates with the inlet port by detecting a magnetic field of the first magnetic member; and a second sensor that is configured to determine whether the communication hole communicates with the outlet port by detecting a magnetic field of the first magnetic member.

The agitation unit further includes a base that is located in the storage body and that is fixed to the agitator rotating shaft, and a door that is fixed to the base, that is configured to open and close the communication hole, and that is configured to agitate garbage stored in the storage body during rotation of the base. The garbage disposal unit includes a drying unit that is configured to dry garbage in the dehydration unit by supplying air to an inside of the housing body. The storage body defines a through hole that is located through the storage body and that is configured to allow an inside of the storage body to communicate with an inside of the housing body, the drying unit includes a supply duct that is configured to guide air to the housing body, a heater that is located in the supply duct, a fan that is configured to supply air to the supply duct, and a discharge duct that is configured to connect an inside of the housing body with an outside of the cabinet.

The crushing unit includes a support body that includes an introduction face that is configured to receive garbage and a discharge face that is configured to discharge garbage; and a blade that is rotatably located at the support body, that is configured to crush garbage received through the introduction face, and that is configured to transfer the garbage to the discharge face. The garbage disposal unit includes a washing water nozzle that is configured to spray water into the support body. The washing water nozzle includes a first nozzle that is fixed to the support body and that is configured to spray water in a first rectangular pyramid shape that has a first base width that is parallel to the introduction face and that has a first base length that is perpendicular to the introduction face and that is shorter than the first base width; and a second nozzle that is fixed to the support body and that is configured to spray water in a second rectangular pyramid shape that has a second base width that is parallel to the introduction face and that has a first base length that is perpendicular to the introduction face and that is longer than the second base width.

The garbage disposal unit includes a reception part that defines a space that is configured to accommodate the blade by protruding toward the inlet port from the discharge face and that defines a discharge hole. The blade is one of a pair of blades that are located in the receptor and that are configured to rotate to move garbage toward the discharge hole. The garbage disposal unit includes a gasket that is located between the discharge face and the inlet port, that is configured to attenuate vibration between the housing and the crushing unit, and that is configured to prevent water leakage between the housing and the crushing unit. The blade includes a first blade that includes a first shaft that is rotatably coupled to the support body, a plurality of first cutters that are each separated from each other by predetermined intervals and that protrude from the first shaft, and a first gear that is located at the first shaft; and a second blade that includes a second shaft that is rotatably coupled to the support body, a plurality of second cutters that protrude from the second shaft and that are configured to pass through spaces defined by the plurality of first cutters during rotation of the first blade and the second blade, and a second gear that is located at the second shaft and that is configured to engage the first gear.

The dehydration unit includes a guide that is configured to prevent garbage stored in the storage body from being discharged to an outside of the storage body through the communication hole during rotation of the agitation unit. The guide includes a first guide that protrudes from the communication hole toward a rotational center of the storage body; and a second guide that protrudes from the communication hole away from the rotational center of the storage body. The rotating shaft includes a shaft body that extends through the housing body, that is configured to rotate in the housing body, and that defines a shaft through hole. The agitation unit includes an agitator rotating shaft that is located in the shaft through hole and that is connected to the driving unit. The garbage disposal unit further comprises a power transmission unit that is located in the shaft through hole, that is configured to support the agitator rotating shaft, and that is configured to transmit one of a clockwise rotational force and a counterclockwise rotational force to the shaft body.

The agitation unit includes a base that is located in the storage body and that is fixed to the rotating shaft of the agitation unit, a door that is fixed to the base, that is configured to open and close the communication hole, and that is configured to agitate garbage stored in the storage body during rotation of the base, and a scraper that is configured to protrude from the door and that is configured to contact an inner surface of the storage body. The garbage disposal unit includes a housing door that is located at the housing body and that is configured to selectively open and close the outlet port; a drawer that is located in the cabinet and that defines a space for storing garbage discharged from the outlet port; and a discharge duct that is configured to connect an inside of the housing body to communicate with an outside of the cabinet. The drawer is retractably located in the cabinet.

An object of the subject matter described in this application is to provide a garbage disposal unit capable of crushing, dehydrating and drying garbage and a method of controlling the same.

Another object of the subject matter described in this application is to provide a garbage disposal unit in which a dehydration unit for dehydrating garbage is rotated about a rotating shaft parallel to the ground and a method of controlling the same.

A further object of the subject matter described in this application is to provide a garbage disposal unit capable of minimizing garbage remaining at a crushing unit for crushing garbage and a method of controlling the same.

BRIEF DESCRIPTION OF THE DRAWINGS

FIGS. 4(*a*) and 4(*b*) are views of an example crushing unit included in a garbage disposal unit.

DETAILED DESCRIPTION

A garbage disposal unit may detachably installed at a sink outlet D of a sink cabinet S, or may be independently installed to crush, hydrate and dehydrate garbage introduced by a user without installation at a sink cabinet. For convenience of explanation, the garbage disposal unit 100 will be described hereinafter as being detachably installed at a sink cabinet.

Figure 1A:
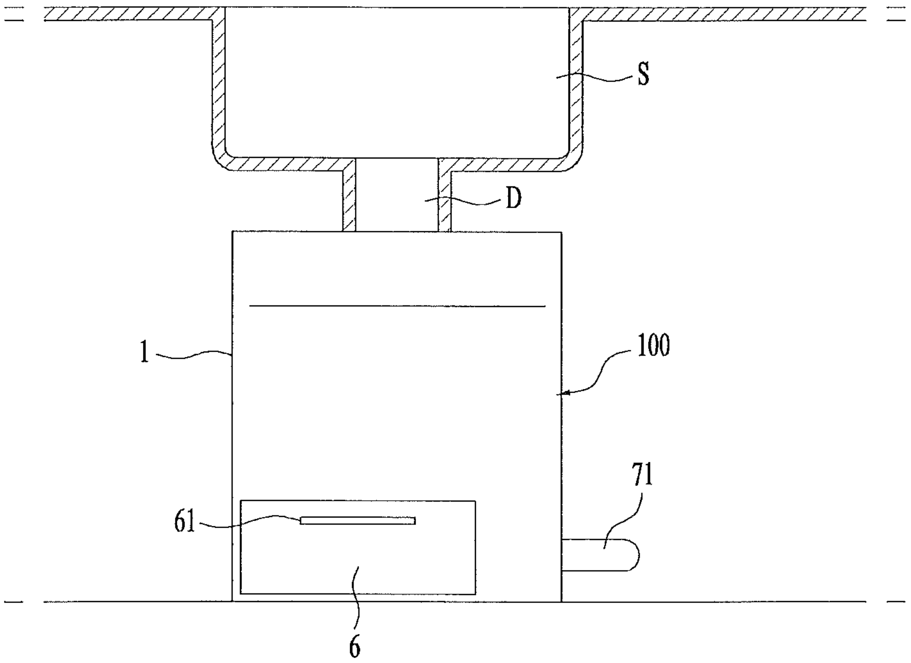
FIGS. 1(*a*), 1(*b*), 2, and 13 are views of an example garbage disposal unit.
Figure 1B:
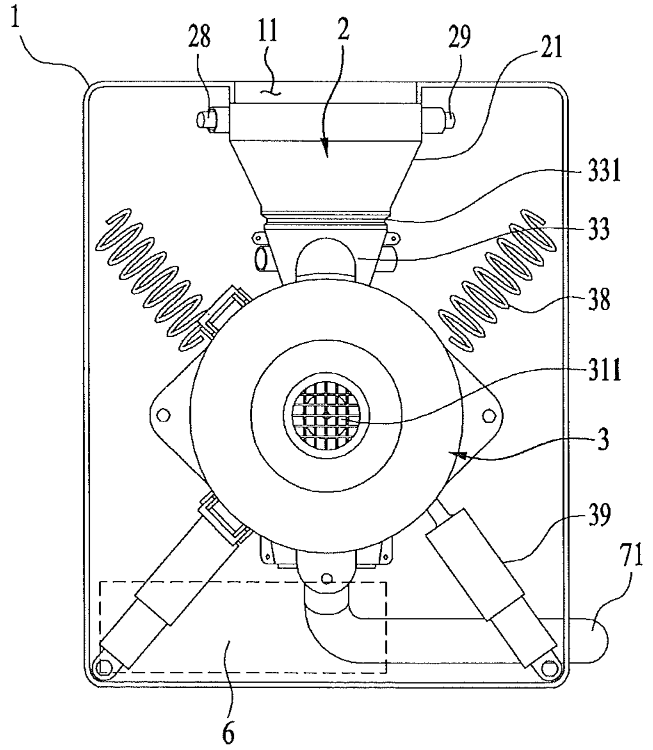

As shown in FIGS. 1(*a*) and 1(*b*), the garbage disposal unit 100 includes a cabinet 1 detachably coupled to the sink outlet D through a connector 11, a crushing unit 2 disposed in the cabinet 1 to crush garbage supplied through the sink outlet D, a housing 3 into which the garbage crushed at the crushing unit 2 is introduced, and a dehydration unit 4 (see FIG. 3) rotatably disposed in the housing 3 and defining a space for containing garbage.

The cabinet 1 may be provided therein with a drawer 6 positioned under the housing 3 to store garbage discharged from the housing 3.

Figure 2:
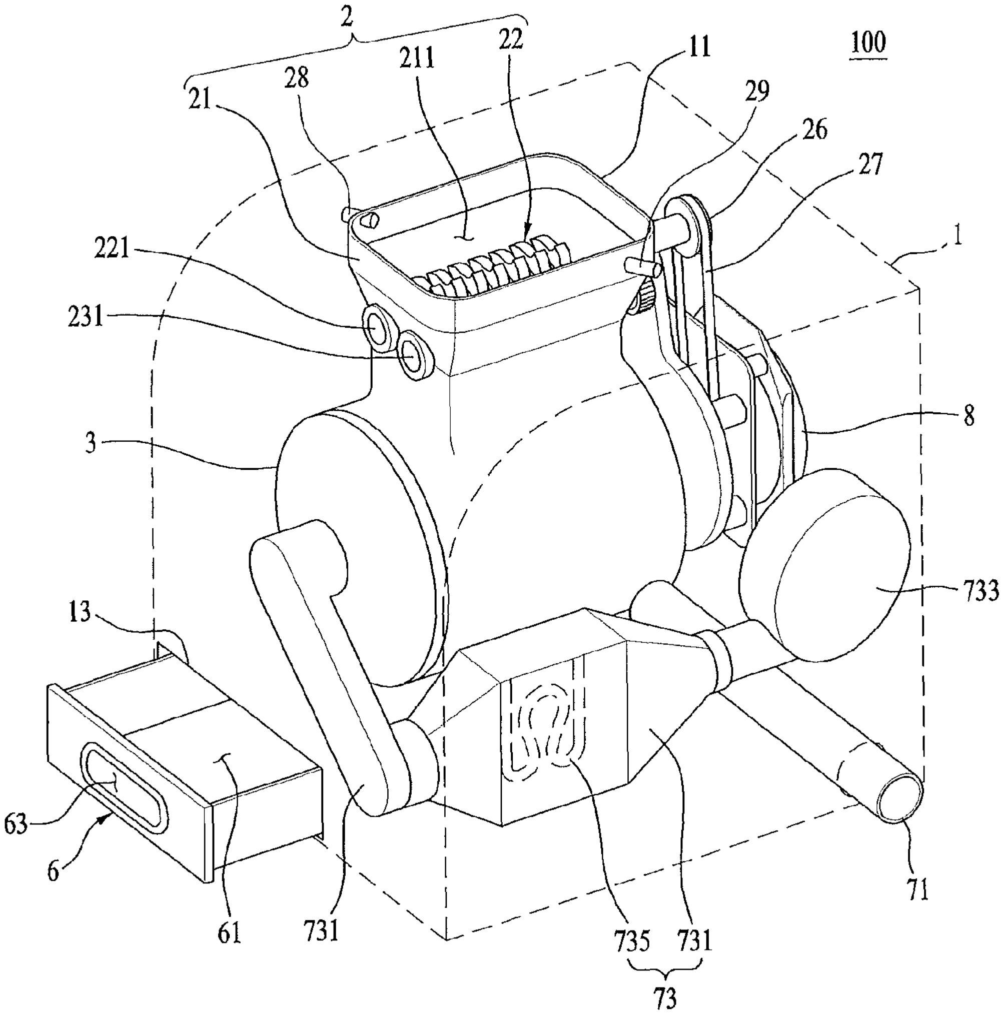

As shown in FIG. 2, the drawer 6 may include a drawer body 61 disposed under the housing 3 and defining a space for storing garbage, and a handle 63 for allowing a user to conveniently pull out the drawer body 61.

The drawer body 61 may be pulled out of the cabinet 1 or pushed into the cabinet 1 through a drawer opening 13.

The crushing unit 2 includes a support body 21 for guiding garbage supplied through the connector 11 toward the housing 3, and blades 22 and 23 disposed in the support body 21 to crush garbage.

Figure 3A:
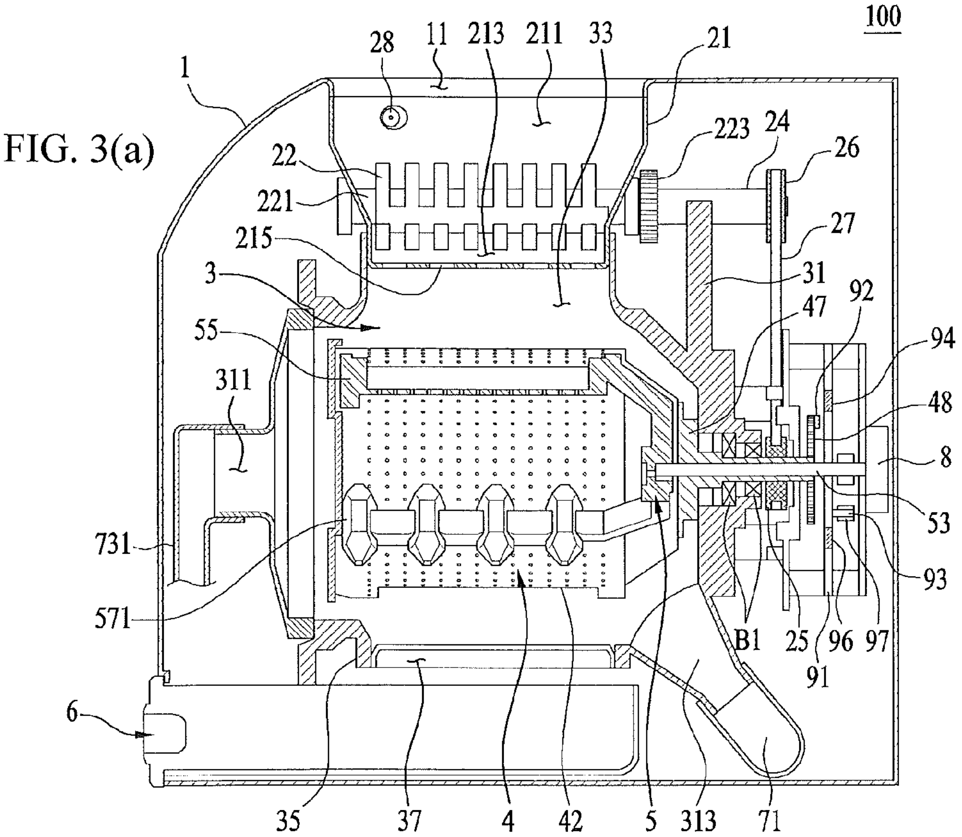
FIGS. 3(*a*) and 3(*b*) are a cross-sectional views of an example garbage disposal unit.
Figure 3B:
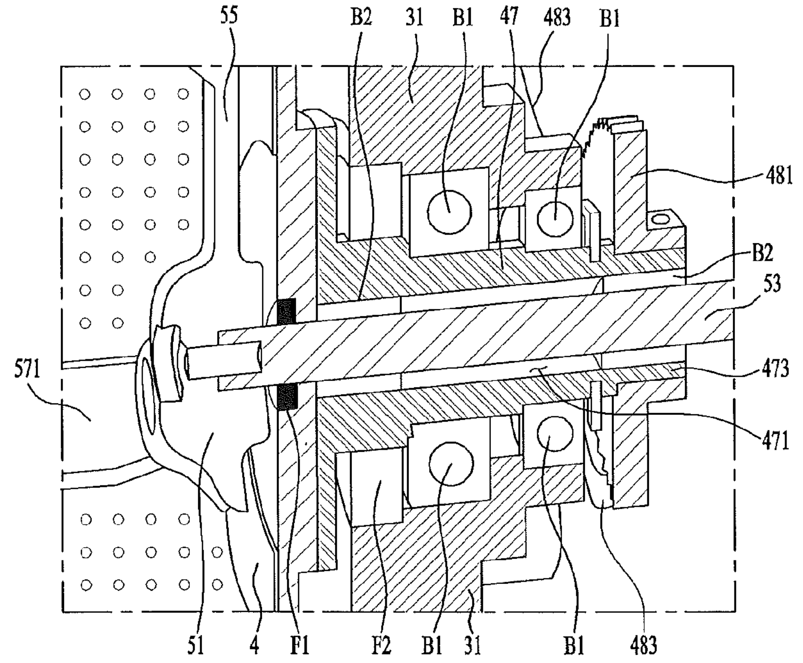

As shown in FIGS. 3(*a*) and 3(*b*), the support body 21 may be configured into a pipe shape having open opposite surfaces. Specifically, the support body 21 may include an introduction face 211 communicating with the connector 11 and through which garbage is supplied to the blades 22 and 23, and a discharge face 213 through which garbage crushed by the blades 22 and 23 is discharged to the housing 3.

The connector 11 provided at the cabinet 1 and the introduction face 211 provided at the support body 21 may be constructed to have a shape capable of being coupled to the sink outlet D of the sink cabinet.

The blades 22 and 23 may include a first blade 22 disposed between the introduction face 211 and the discharge face 213, and a second blade 23 disposed between the introduction face 211 and the discharge face 213 and rotating in the direction opposite to a rotational direction of the first blade 22.

As shown in FIGS. 4(*a*) and 4(*b*), the first blade 22 may include a first shaft 221 rotatably supported by the support body 21, a plurality of first cutters 225 provided at the first shaft 221 and disposed in the support body 21, and a first gear 223 fixed to the first shaft 221 and disposed outside the support body 21.

The second blade 23 may include a second shaft 231 rotatably supported by the support body 21, a plurality of second cutters 235 provided at the second shaft 231 and disposed in the support body 21, and a second gear 233 fixed to the second shaft 231 and engaging with the first gear 223.

The plurality of first cutters 225 may be arranged spaced apart from each other at predetermined intervals in a longitudinal direction of the first shaft 221, and the plurality of second cutters 235 may be positioned in spaces defined between adjacent cutters 225.

The blades 22 and 23 may be rotated by a driving unit 8 for rotating the dehydration unit 4, or may be rotated by an additional blade driving unit separated from the driving unit 8.

When the blades are constructed to be rotated by the driving unit 8, a transmission unit should be provided between the crushing unit 2 and the driving unit 8.

The transmission unit may include a driving shaft 24 connected to the first gear 223, a follow pulley 26 provided at the driving shaft 24, a driving pulley 25 rotated by the driving unit 8, and a belt 27 connected between the driving pulley 25 and the follow pulley 26.

When the driving pulley 25 is rotated by the driving unit 8, the first gear 223 is rotated by the belt 27 and the follow pulley 26. When the first gear 223 is rotated, the second gear 233 is rotated in the direction opposite to the rotational direction of the first gear 223. Consequently, garbage supplied through the introduction face 211 is crushed while passing between the first cutters 225 and the second cutters 235 and then is transferred to the discharge face 213.

The garbage disposal unit 100 can dehydrate garbage not only by the dehydration unit 4 but also by a drying unit 73 which will be described later. If a size of garbage discharged from the crushing unit 2 is maintained at a predetermined value or less, dehydration efficiency and drying efficiency can be improved.

In order to maintain a size of garbage discharged from the crushing unit 2 at a predetermined size or less, the discharge face 213 of the support body 21 may further be provided with a reception part 214 defining a space for accommodating the blades 22 and 23, and discharge holes 215 formed through the reception part 214 to allow garbage to be discharged to the outside of the reception part 214.

A circumferential surface of the first cutters 225 and a circumferential surface of the second cutters 235 are at least partially disposed in the space defined by the reception part 214. Accordingly, garbage, which has been introduced to the reception part 214 after crushing by the first and second cutters 225 and 235, is crushed by the first and second cutters 225 and 235 in the reception part 214 until a size of the garbage is reduced to a sufficient size to pass through the discharge holes 215.

In the case of garbage which is difficult to crush or has high viscosity, the garbage crushed by the first and second cutters 225 and 235 may not be separated from the first and second cutters 225 and 235 but may remain on surfaces of the first and second cutters 225 and 235. In this case, foul smells may be generated due to decomposition of the garbage.

In order to solve such a problem, the garbage disposal unit may further include a washing water spraying unit for spraying water into the support body 21. The washing water spraying unit may include a first nozzle 28 and second nozzle 29 provided at the support body 21 to spray water supplied from the outside.

The first nozzle 28 may be constructed such that a width of a spray cone in a direction parallel to the introduction face 211 is larger than that of the spray cone in a direction perpendicular to the introduction face 211 whereas the second nozzle 29 may be constructed such that a width of a spray cone in a direction perpendicular to the introduction face 211 is larger than that of the spray cone in a direction parallel to the introduction face 211. Consequently, spraying areas of water sprayed from the first and second nozzles 28 and 29 are different from each other, thus minimizing an area of an internal space of the support body 21 to which sprayed water is not supplied.

In order to maximize such effects, the first nozzle 28 and the second nozzle 29 may be fixed so as to the support body 21 to face each other and to spray water toward the blades 22 and 23.

The first nozzle 28 and the second nozzle 29 may be constructed such that a spraying area of water sprayed from the first nozzle 28 perpendicularly intersects with a spraying area of water sprayed from the second nozzle 29.

Figure 5C:
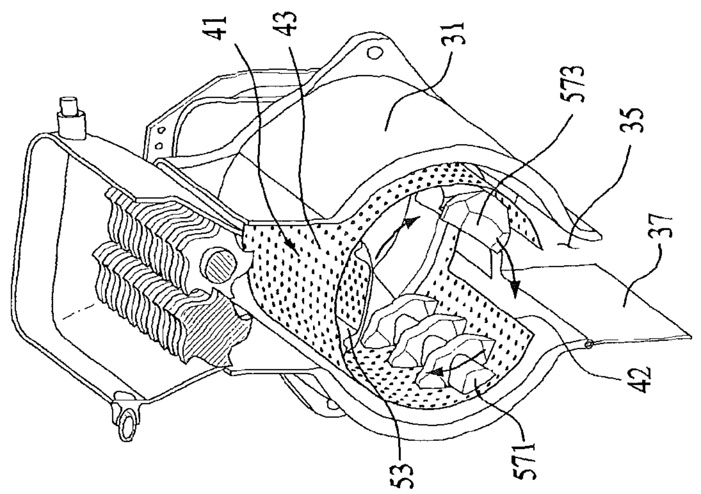
FIGS. 5(*a*), 5(*b*), and 5(*c*) are views of an example operation of a dehydration unit included in a garbage disposal unit.
Figure 5B:
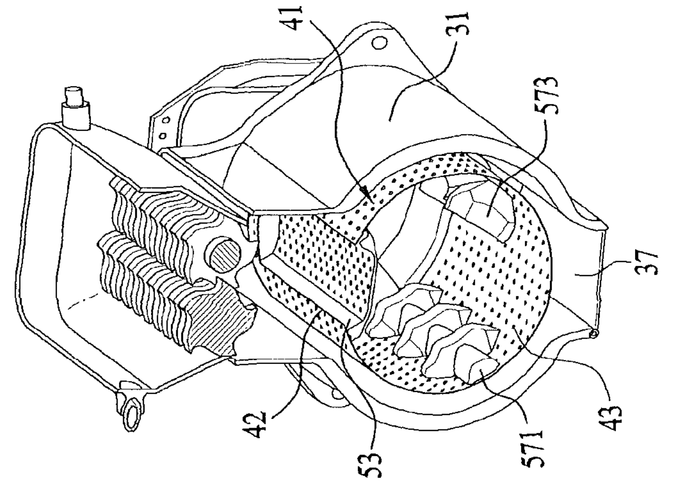
Figure 5A:
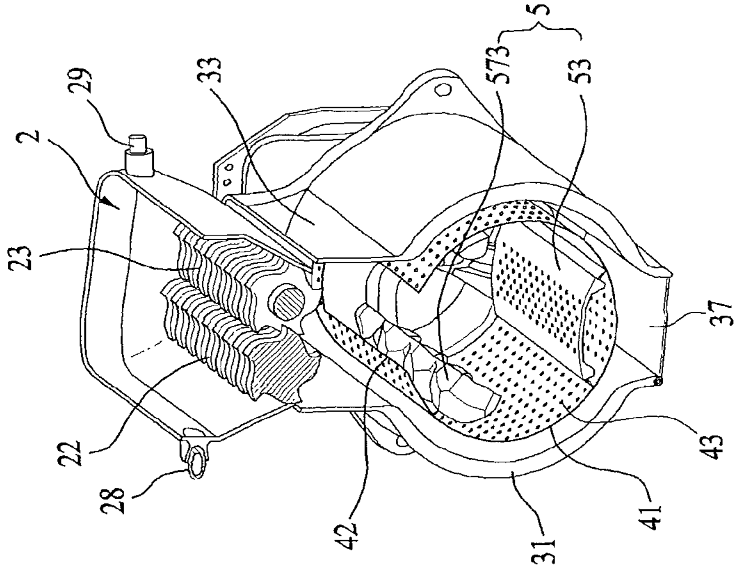

As shown in FIG. 5, the housing 3 serves not only to connect the crushing unit 2 to the drawer 6 but also to provide a space for accommodating the dehydration unit 4. Furthermore, the housing 3 also serves to guide water discharged from the sink outlet D of the sink cabinet toward a sewage line.

The housing 3 include a housing body 31 positioned between the crushing unit 2 and the drawer 6. The housing body 31 includes an inlet port 33 communicating with the discharge face 213 of the crushing unit 2 or the discharge holes 215, and an outlet port 35 communicating with the drawer 6. In other words, the housing 3 may be configured to have a cylindrical shape having open opposite sides.

The housing 3 is connected to the support body 21 through a gasket 331 (see FIG. 1) located between the support body 21 and the housing 3, thus preventing water from leaking between the support body 21 and the housing 3. If the gasket 331 is made of a material such as rubber capable of absorbing vibration, the gasket 331 may also serve to attenuate vibration between the support body 21 and the housing 3.

The outlet port 35 provided at the housing body 31 is opened and closed by a housing door 37 provided at the housing body 31. The housing door 37 selectively open the outlet port 35 by a housing door driving unit.

The housing body 31 is supported in the cabinet 1 by a vibration damping unit 39 (see FIG. 1(*b*)). The vibration damping unit 39 serves to prevent vibration generated from the driving unit 8 provided at an outer surface of the housing body 31 or vibration generated from the crushing unit 2 connected to the housing body 31 from being transmitted to the cabinet 1.

The vibration damping unit 39 may be configured into various structures so long as it can serve the above function. FIG. 1(*b*) illustrates an example in which the vibration damping unit 39 is constituted by dampers and springs provided between the cabinet 1 and the housing body 31.

For drying of garbage, the housing body 31 may be provided with a first communication part 311 through which external air is introduced, and a second communication part 313 through which air or water in the housing body 31 is discharged to the outside of the cabinet 1, detailed description of which will be given later.

The dehydration unit 4, which is provided in the housing body 31 to dehydrate and agitate garbage which is supplied to the housing 3 after being crushed, includes a storage body 41 disposed in the housing body 31 and defining a space for receiving garbage, an agitator rotating shaft 47 disposed parallel to the ground to rotatably support the storage body 41 in the housing body 31, and a communication hole 42 formed through the storage body 41 to communicate with the inlet port 33 or the outlet port 35 depending on a rotational angle of the storage body 41.

The storage body 41 is configured into a hollow cylindrical shape, and the agitator rotating shaft 47 is fixed to a rear surface of the storage body 41.

The storage body 41 has a plurality of through holes 43 formed at an outer circumferential surface, a front surface and a rear surface thereof so as to allow the inside of the storage body 41 to communicate with the inside of the housing body 31. Accordingly, when the storage body 41 rotates, water contained in garbage can be discharged to the housing body 31 through the through holes 43.

As shown in FIG. 3, the agitator rotating shaft 47, which serves to enable the storage body 41 to be rotated about an axis parallel to the ground, includes a shaft body 473 fixed to the rear surface of the storage body 41 and extending through the housing body 31, and a shaft through hole 471 longitudinally formed through the shaft body 473.

The housing body 31 includes a bearing B1, and the shaft body 473 is fitted in the bearing B1 and rotatably coupled to the housing body 31. A sealer F2 is provided between the housing body 31 and the shaft body 473 so as to prevent garbage from being introduced to a clearance between the housing body 31 and the shaft body 473.

The storage body 4 provided in the garbage disposal unit does not rotate about the axis perpendicular to the ground but uniquely rotates about the axis parallel to the ground.

In the case of the storage body 41 adapted to rotate about the axis perpendicular to the ground, there is inconvenience in that a user must directly take garbage out of the storage body 41 or a user must separate the storage body 41 from the garbage disposal unit 100 in order to discharge dehydrated garbage from the storage body 41.

On the contrary, when the storage body 41 is adapted to rotate about the axis parallel to the ground, dehydrated garbage can be discharged from the storage body only by positional control of the communication hole 42. Therefore, this case is convenient, compared to the former case in which the storage body is adapted to rotate about the axis perpendicular to the ground as will be described in detail below.

The garbage disposal unit 100 may further include an agitation unit 5 rotatably disposed in the storage body 41 to agitate garbage in the storage body 41 and to open and close the communication hole 42.

Figure 6:
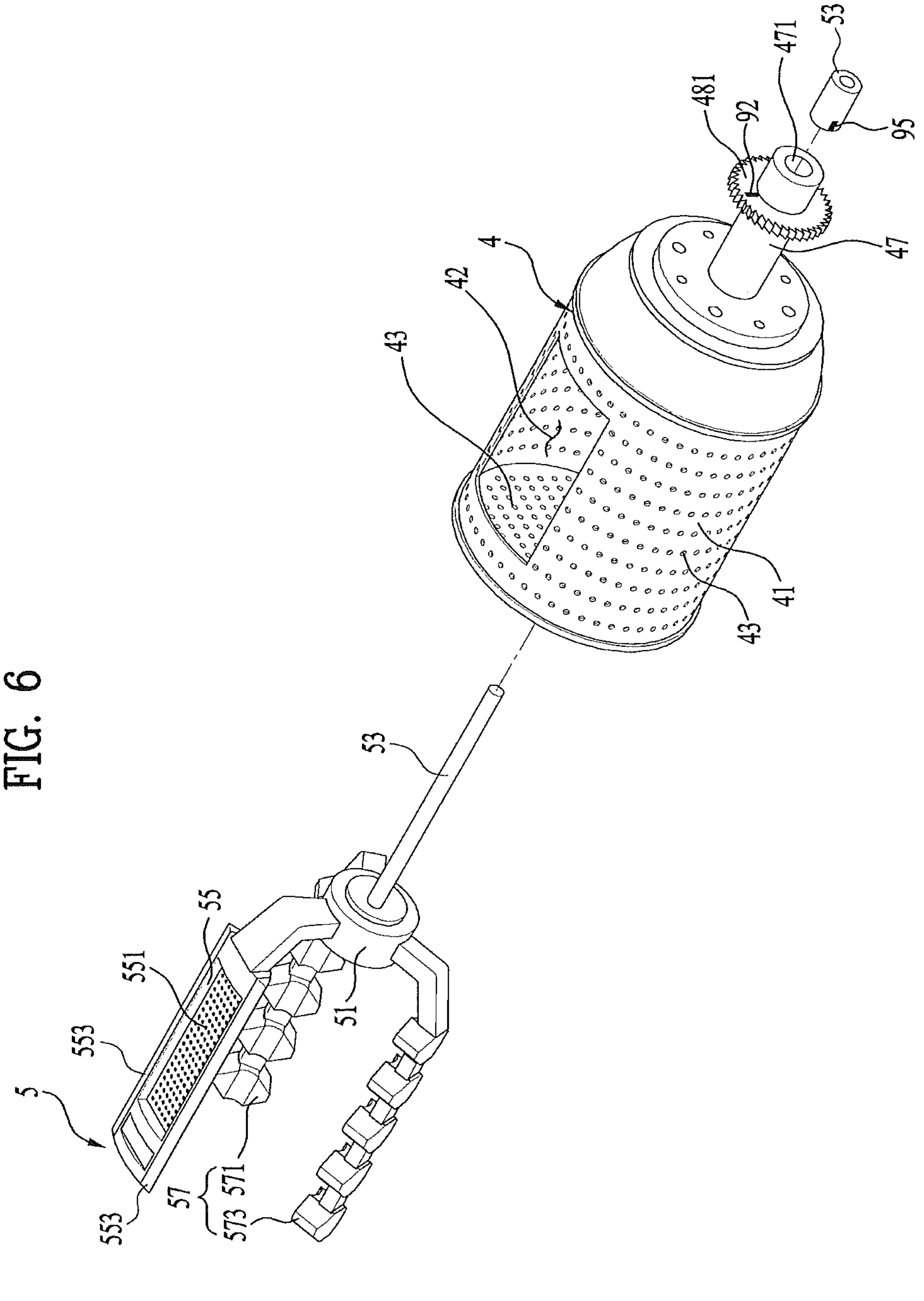
FIG. 6 is a view of an example dehydration unit and agitation unit included in a garbage disposal unit.

As shown in FIG. 6, the agitation unit 5 provided in the garbage disposal unit may include a base 51 disposed in the storage body 41, an agitator rotating shaft 53 extending from the base 51 and being fitted in the shaft through hole 471, and a door 55 provided at the base 51 and positioned in the storage body 41 to close the communication hole 42.

As shown in FIG. 3, the agitator rotating shaft 53 of the agitation unit 5 is fitted in the shaft through hole 471 to connect the base 51 to the driving unit 8 that may be located outside the housing 3 and configured to rotate the agitation unit 5.

The shaft through hole 471 is provided with a sealer F1 for preventing garbage or water in the dehydration unit 4 from being introduced to a clearance between the shaft through hole 471 and the rotating shaf5 53 of the agitation unit 5. In other words, the sealer F1 is provided at the rear surface of the storage body 41 to prevent garbage or water from being introduced to the shaft through hole 471.

The agitator rotating shaft 53 is rotatably supported by a power transmission unit B2 disposed in the shaft through hole 471. The power transmission unit B2 may be implemented as a one way power transmission unit for transmitting only one of clockwise power and counterclockwise power supplied from the driving unit 8 to the shaft body 473, e.g., a one way clutch or a one way bearing.

Accordingly, when the driving unit 8 rotates the agitator rotating shaft 53 in the first direction, e.g., either clockwise or counterclockwise, the power transmission unit B2 transmits rotational force supplied from the agitator rotating shaft 53 to the shaft body 473, thus rotating the storage body 41 together with the agitation unit 5.

On the contrary, when the driving unit 8 rotates the agitator rotating shaft 53 in a second direction, e.g., opposite to the first direction, the power transmission unit B2 does not transmit rotational force supplied from the agitator rotating shaft 53 to the shaft body 473, thus rotating only the agitation unit 5 but not rotating the storage body 41.

Although it is possible to rotate only the agitation unit 5 without rotation of the storage body 41, the garbage disposal unit 100 may further include a lock 48 for preventing the storage body 41 from rotating with the agitation unit 5 when the agitator rotating shaft 53 rotates in the second direction, e.g., for preventing the storage body 41 from rotating with the agitation unit 5 in an unintended situation.

The lock 48 may include a first engaging part 481 provided at the shaft body 473, and a second engaging part 483 provided at the housing body 31 to releasably engage with the first engaging part 481.

Figure 7:
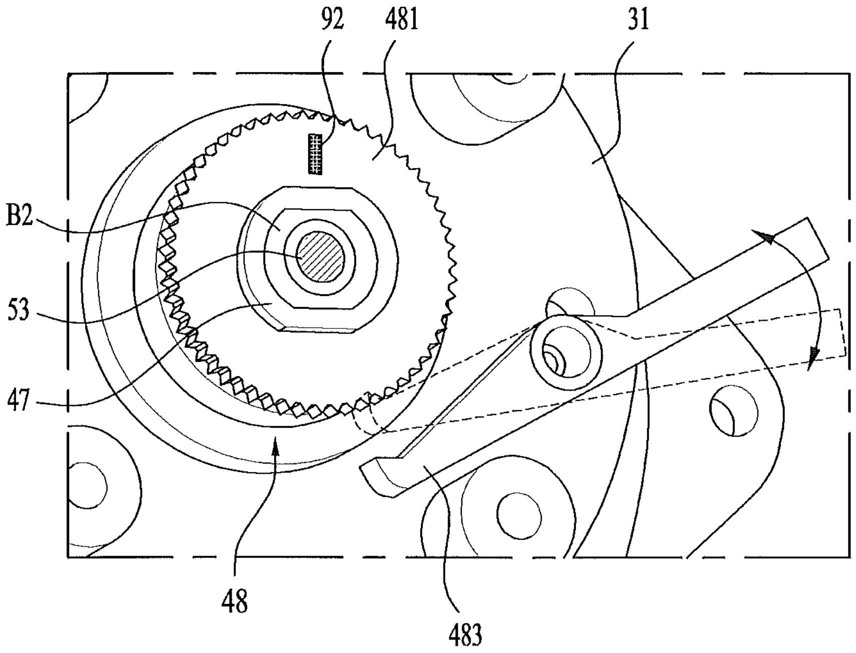
FIG. 7 is a view of an example lock included in a garbage disposal unit.

As shown in FIG. 7, the first engaging part 481 may be configured into a gear shape having protrusions formed in a circumferential surface thereof and may be fixed to the shaft body 473. The second engaging part 483 may be rotatably provided at the housing body 31 and may be configured into a bar shape a free end of which checks rotation of the protrusions of the first engaging part 481.

The second engaging part 483 receives swinging force from a power supply such as a motor and a solenoid.

Accordingly, the garbage disposal unit 100 is constructed such that the agitation unit 5 is rotated with the storage body 41 when the driving unit 8 rotates the agitation unit 5 in the first direction whereas only the agitation unit 5 is rotated when the driving unit 8 rotates the agitation unit 5 in the second direction under the condition that the second engaging part 483 engages with the first engaging part 481.

As shown in FIG. 6, the agitation unit 5 may further include an agitating bar 57 fixed to the base 51 and rotatable in the storage body 41 in order to improve agitating efficiency for garbage contained in the storage body 41.

The agitating bar 57 may include a first bar 571 and a second bar 573 angularly spaced apart from the door 55 by the same interval about the agitator rotating shaft 53. Specifically, when the agitating bar 57 includes the first bar 571 and the second bar 573, the door 55, the first bar 571 and the second bar 573 are angularly spaced apart from one another by an angle of 120° about the agitator rotating shaft 53.

In order to facilitate agitation of garbage, the first bar 571 and the second bar 573 may be provided with a plurality of protrusions.

The door 55 provided at the agitation unit 5 may further include a plurality of door through holes 551 formed through the door 55 to allow the inside of the storage body 41 to communicate with the inside of the housing body 31.

If the door 55 is not provided with the door through holes 551, upon rotation of the storage body 41, water separated from garbage cannot be discharged in a direction of the door 55, and, as such, the storage body 41 may rotate while eccentrically loaded. The door through holes 551 are intended to solve such a problem.

Furthermore, the door through holes 551 also serve to allow air supplied from the drying unit 73, which will be described in further detail below, to be supplied to the inside of the storage body 41 so as to improve drying efficiency.

The door 55 may further be provided with a scraper 553 to facilitate agitation of garbage performed by the door 55.

Figure 8B:
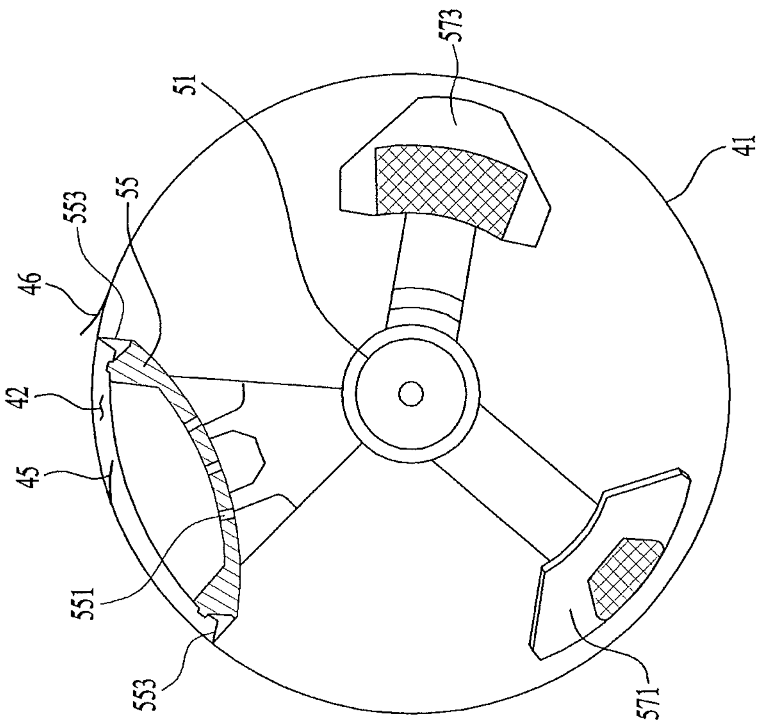
FIGS. 8(*a*) and 8(*b*) are views of an example guider included in a garbage disposal unit.
Figure 8A:
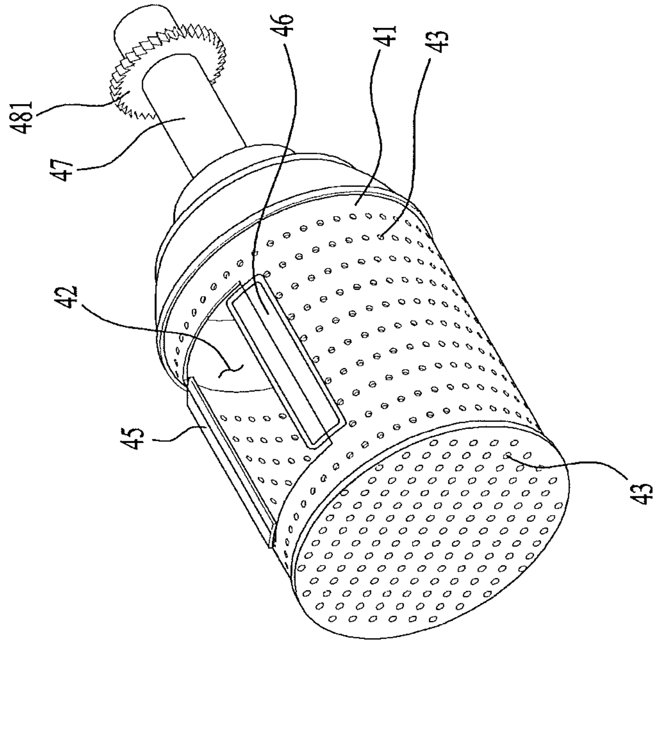

As shown in FIGS. 8(*a*) and 8(*b*), the scraper 553 may protrude from an outer surface of the door 55 to contact an inner surface of the storage body 41. The scraper 553 may be provided at opposite lateral sides of the door 55 in a longitudinal direction parallel to the rotating shaft of the storage body 41. The scraper 553 may be made of a resilient material such as rubber.

When the door 55 equipped with the scraper is rotated, although garbage contained in the storage body 41 is easily agitated by the scraper 553, a problem may occur in that garbage contained in the storage body 41 is discharged to the outside of the storage body 41 when the door 55 passes over the communication hole 42.

In order to solve such a problem, the dehydration unit 4 may be provided with a guide for preventing garbage contained in the storage body 41 from being discharged the outside of the storage body 41 through the communication hole 42.

The guide may include a first guide 45 protruding toward the rotating center of the storage body 41 from the communication hole 42, and a second guide 46 protruding from the communication hole 42 in a direction away from the rotating center.

Accordingly, if the second direction in which only the agitation unit 5 is rotated is set to be a clockwise direction, when the door 55 is rotated, the first guide 45 guides garbage toward the storage body 41 while the second guide 46 prevents garbage remaining at the scraper 553 from being separated from the scraper 553.

The garbage disposal unit 100, which has the above-described construction, may further include a first position detector for detecting a position of the communication hole 42 provided at the dehydration unit 4, and a second position detector for detecting a position of the door 55.

Figure 9:
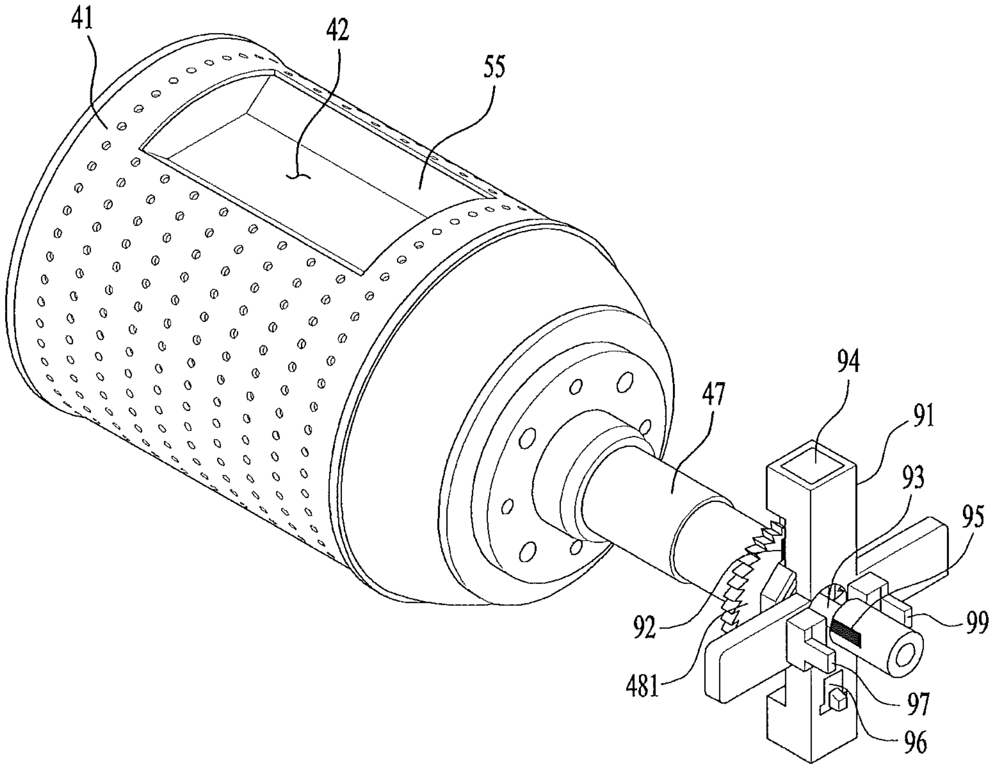
FIG. 9 is a view of an example first position detector and second position detector included in a garbage disposal unit.

As shown in FIG. 9, the first position detector may include a first magnetic member 92 fixed to the rotating shaft 47 of the dehydration unit and longitudinally disposed parallel to the communication hole 42, a first sensor 94 provided at the housing body 31 and disposed parallel to the inlet port 33 to detect magnetic force of the first magnetic member 92, and a second sensor 96 provided at the housing body 31 and disposed parallel to the outlet port 35 to detect magnetic force of the first magnetic member 92.

The first magnetic member 92 may be provided at the first engaging part 481 fixed to the shaft body 473, and the first sensor 94 and the second sensor 96 may be provided at a first sensor support 91 externally fixed to the housing body 31.

When the inlet port 33 and the outlet port 35 formed at the housing body 31 are provided at upper and lower surfaces of the housing body 31, respectively, e.g., when the inlet port 33 and the outlet port 35 are angularly spaced apart from each other by an angle of 180° about the shaft body 473, the first sensor 94 and the second sensor 96 should accordingly be positioned angularly spaced apart from each other by an angle of 180°.

The second position detector may include a second magnetic member 95, and a third sensor 97 provided outside the housing body 31 to detect magnetic force of the second magnetic member 95 so as to determine whether the communication hole 42 is shut by the door 55.

The second magnetic member 95 may be angularly spaced apart from each other about the agitator rotating shaft 53, or may be disposed parallel to the door 55 in a longitudinal direction of the agitator rotating shaft 53.

FIG. 9 illustrates an example in which the second magnetic member 95 is angularly spaced apart from the door 55 about the agitator rotating shaft 53, and the third sensor 97 is disposed at a position spaced apart from the first sensor 94 by an angle of 90° and is fixed to a second support 93 externally fixed to the housing body 31.

The garbage disposal unit 100 may further include the drying unit 73 which supplies air to the housing 3 to dry garbage contained in the dehydration unit 4.

As shown in FIG. 2, the drying unit 73 may include a supply duct 731 for guiding air to the housing body 31, a fan 733 for supplying air to the supply duct 731, a heater 735 for heating air introduced to the supply duct 731, and a discharge duct 71 connecting the inside of the housing body 31 to the outside of the cabinet 1.

The supply duct 731 may be connected to the first communication part 311 provided at the housing body 31, and the discharge duct 71 may be adapted to connect the second communication part 313 provided at the housing body 31 to a sewage line disposed outside the cabinet 1.

Therefore, when the fan 733 is activated, air in the cabinet 1 is heated by the heater 735 while being transferred to the housing body 31 through the supply duct 731.

Air introduced to the inside of the housing body 31 is supplied into the storage body 41 through the through holes 43 formed through the outer circumferential surface and the front surface, and air having exchanged heat with garbage is discharge to the outside of the cabinet 1 through the discharge duct 71.

The discharge duct 71 serves as an air discharge pipe for discharging air during drying of garbage. However, the discharge duct 71 also serves as a water discharge pipe during dehydration and crushing in which garbage is not dried.

Hereinafter, a method of controlling the garbage disposal unit 100 will be described with reference to FIGS. 10 to 12.

Since the garbage disposal unit 100 is rotatable about the axis parallel to the ground, a dehydration unit opening operation S1 of controlling a position of the dehydration unit 4 so as to enable garbage discharged from the crushing unit 2 to be introduced to the dehydration unit 4 is first performed, and then a crushing operation S2 is performed. After completion of the crushing operation S2, a dehydration unit closing operation S3 of closing the communication hole 42 of the dehydration unit is performed.

Figure 11:
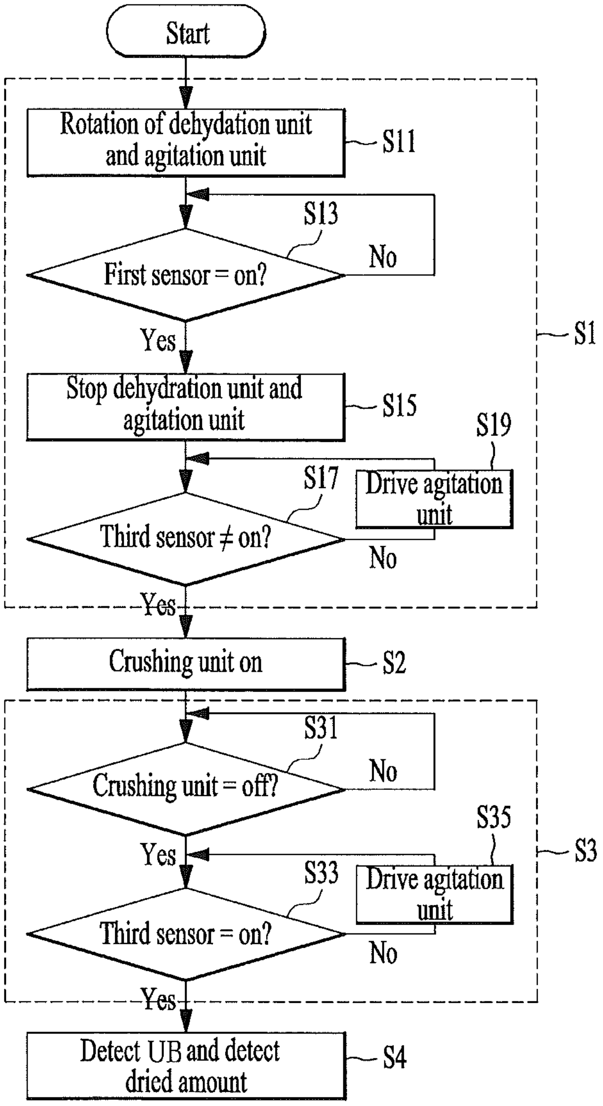
FIG. 11 is a flowchart of example opening and closing operations of a dehydration unit.

As shown in FIG. 11, the dehydration unit opening operations S1 may include a first connection operation of rotating the dehydration unit 4 to connect the communication hole 42 to the inlet port 33 of the housing 3 (S11, S13, and S15), and an opening operation of rotating only the agitation unit 5 to close the communication hole 42 by the door (S17 and S19).

The first connection operation includes an operation of rotating the agitator rotating shaft 53 in the first direction, e.g., a direction of rotating both the dehydration unit and the agitation unit, by the driving unit 8 to rotate the agitation unit 5 and the dehydration unit 4 together (S11), and an operation of halting rotation of the dehydration unit when the communication hole 42 reaches a position corresponding to the inlet port 33 of the housing (S13 and S15).

The operation S13 of determining whether the communication hole 42 reaches the position corresponding to the inlet port 33 is performed in such a way as to determine whether the first sensor 94 detects magnetic force of the first magnetic member 92.

Since the first magnetic member 92 is fixed to the rotating shaft 47 of the dehydration unit to be parallel to the communication holes 42 and the first sensor 94 is provided at the housing 3 to be parallel to the inlet port 33, the control unit, e.g., for controlling operation of the driving unit, change of rotating direction, operation of the drying unit and the dehydration unit, and operation of the washing water spraying unit; not shown, can recognize that the communication hole 42 is positioned under the inlet port 33 when the first sensor 94 detects magnetic force of the first magnetic member 92.

When the communication hole 42 is determined to be positioned under the inlet port 33, the control unit halts operation of the driving unit 8 to halt rotation of the dehydration unit 4 and the agitation unit 5.

After completion of the first connection operation (S11, S13, and S15), the opening operation (S17 and S19) of changing a rotational direction of the driving unit 8 by the control unit to rotate the agitation unit 5 in the second direction, e.g., a direction in which the dehydration unit is halted and only the agitation unit is operated, is performed. The opening operation S17 is performed in such a way as to determine whether the third sensor 87 detects magnetic force of the second magnetic member 95.

Since the second magnetic member 95 and the third sensor 97 are provided at the agitator rotating shaft 53 and the housing 3, respectively, to face each other when the communication hole 42 is shut by the door 55, the control unit determines that the communication hole 42 is shut by the door 55 when the third sensor detects magnetic force of the second magnetic member 95, and the control unit determines that the communication hole 42 is opened by the door 55 when the third sensor 87 does not detects magnetic force of the second magnetic member 95.

Accordingly, the opening operation is performed in such a way that whether the second magnetic member 95 is detected by the third sensor 97 is determined (S17). At this point, when the third sensor 97 detect the second magnetic member 95, only the agitation unit 5 is rotated to open the communication hole 42 of the dehydration unit 4 until the third sensor 97 cannot detect the second magnetic member 95 (S19). In this case, positional relationship of the housing 3, the dehydration unit 4 and the agitation unit 5 is shown in FIG. 5(*a*).

In the method, when the dehydration opening operation S1 is completed, a crushing operation S2 of driving the crushing unit 2 is performed.

The crushing operation S2 serves to rotate the first blade 22 and the second blade 23 through the driving unit 8 or an additional blade driving unit by the control unit 8. The crushing operation S2 may further include spraying water by the first and second nozzles 28 and 29 during rotation of the first blade 22 and the second blade 23 in order to prevent garbage from remaining at the blades.

After garbage is supplied to the dehydration unit 4 in the crushing operation S2, the method performs the closing operation S3 of closing the communication hole 42 of the dehydration unit by the door 55 of the agitation unit.

Specifically, the closing operation S3 may include an operation of determining whether supply of garbage to the dehydration unit 4 is completed (S31), and an operation of determining whether the third sensor 97 detects magnetic force of the second magnetic member 95 (S33).

Whether supply of garbage to the dehydration unit 4 is completed can be determined by checking whether operation of the crushing unit 2 is halted by the control unit.

Since the communication hole 42 is opened when the third sensor 97 cannot detect magnetic force of the second magnetic member 95, the control unit rotates the driving unit 8 or only the agitation unit 5 or both in the second direction until the third sensor 97 detects magnetic force of the second magnetic member 95.

When the closing operation S3 is completed, positional relationship among the housing 3, the dehydration unit 4 and the agitation unit 5 is as shown in FIG. 5(*b*). When the closing operation S3 is completed, the method performs a dehydration operation S6 of dehydrating garbage contained in the dehydration unit 3.

The dehydration operation S6 serves to concurrently rotate the dehydration unit 4 and the agitation unit 5 at a predetermined first RPM, e.g., to rotate the rotating shaft of the agitation unit in the first direction, so as to discharge water contained in garbage to the housing body 31 from the storage body 41 of the dehydration unit.

The storage body 41 may rotate without maintenance of dynamic equilibrium, e.g., dynamic balance, depending on position of garbage contained therein.

"Dynamic equilibrium" means a state that, during rotation of a rotating body, centrifugal force of the rotating body or a moment caused by the centrifugal force becomes zero with respect to the axis of rotation. In the case of a rigid body, dynamic equilibrium is maintained when mass of the rigid body is evenly distributed about the axis of rotation.

Accordingly, dynamic equilibrium in a garbage disposal unit may be considered as a state where mass distribution of garbage about an axis of rotation of a storage body including garbage contained therein falls within an allowable range during rotation of the storage body, e.g., state that the storage body rotates within an allowable amplitude range of vibration.

Meanwhile, a state where dynamic equilibrium in a garbage disposal unit is lost, e.g., unbalanced, means that mass distribution about the axis of rotation of the storage body 41 is non-uniform during rotation of the storage body. Loss of dynamic equilibrium occurs when garbage is not evenly distributed about an inner surface of the storage body 41.

When the storage body 41 rotates in an unbalanced state, not only dehydration efficiency may be deteriorated but also vibration and noise may be generated from the storage body 41 and the housing body 31. Hence, the method may further include an operation of resolving unbalance before initiation of the dehydration operation S6 (S4 and S5).

Figure 10:
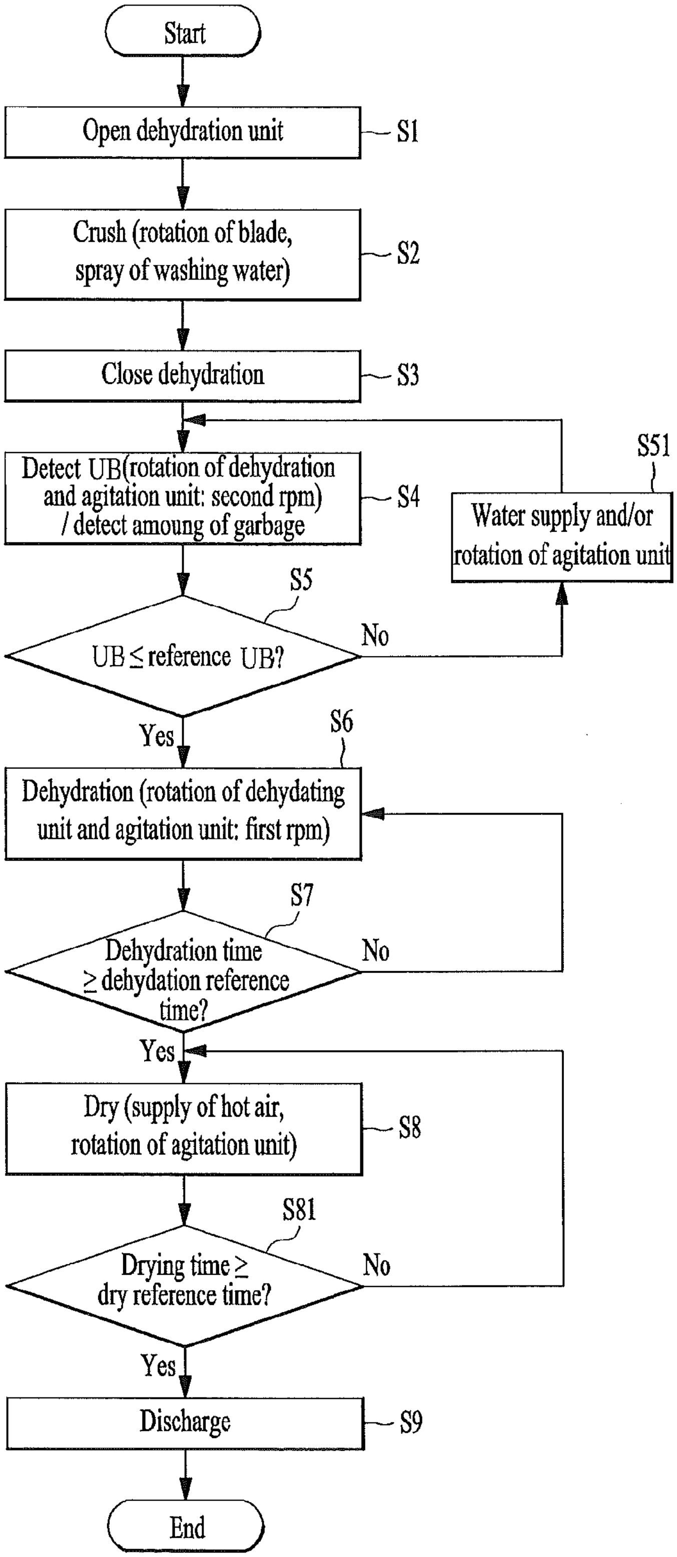
FIG. 10 is a flowchart of an example method of controlling a garbage disposal unit.

As shown in FIG. 10, the unbalance resolving operation may include an operation of detecting unbalance of the storage body 41 (S4), and an operation of determining whether the detected unbalance is equal to or lower than the reference value (UB) (S5).

The detection operation S4 serves to rotate the agitation unit 5 and the storage body 41 at a second RPM lower than the first RPM and then detect a fluctuation range in RPM of the storage body 41 so as to keep the communication hole 42 closed. The determining operation S5 of determining whether the storage body 41 is in unbalance state serves to determine whether the storage body 41 is in an unbalanced state by comparing the detected fluctuation range of RPM with the reference value.

Fluctuation range of RPM of the storage body 41 and the agitation unit 5 may be measured in various ways. In an example, a Hall sensor for detecting magnetic force of the magnetic member provided at a rotor of the driving unit 8 may be provided.

In some implementations, the control unit may determine fluctuation range of RPM in such a manner as to rotate the storage body 41 and the agitation unit 5 at the second RPM for a predetermined period of time by the driving unit 8 and to subtract the minimum RPM from the maximum RPM of the storage body 41 based on a signal sent from the Hall sensor.

When the determined fluctuation range of RPM is equal to or lower than the predetermined reference value, the control unit determines that garbage contained in the storage body 41 is not in an eccentric state with respect to the rotating shaft 47. On the contrary, when the determined fluctuation range of RPM is higher than the predetermined reference value, the control unit determines that garbage contained in the storage body 41 is in an eccentric state with respect to the rotating shaft 47.

If garbage contained in the storage body 41 is not in an eccentric state with respect to the rotating shaft 47, the control unit performs the dehydration operation after completion of the determining operation S5. On the contrary, if garbage contained in the storage body 41 is in an eccentric state with respect to the rotating shaft 47, the control unit resolves the unbalance of the storage body 41 by performing at least one of a water supply operation of supplying water to the housing body 31 and an agitating operation of rotating the agitation unit 5 (S51).

The agitating operation serves to rotate only the agitation unit 5 without rotating the storage body 41. In this operation, garbage is rearranged in the storage body 41 during rotation of the agitation unit 5, thus efficiently resolving unbalance.

In order to prevent garbage contained in the storage body 41 from being discharged to the housing body 31, the agitating operation should be performed after controlling a position of the dehydration unit 4 such that the communication hole 42 of the storage body 41 is disposed at the position corresponding to the inlet port 33 of the housing body 31.

In some implementations, the agitating operation includes, upon completion of the determining operation S5, an operation of controlling a position of the communication hole (e.g., S11, S13, and S15), an operation of rotating only the agitation unit, and an operation of controlling a position of the door such that the communication hole 42 is shut by the door 55 when rotation of the agitation unit is halted (e.g., S33 and S35).

The water supplying operation may be performed through the first and second nozzles 28 and 29 provided at the crushing unit 2, or may be performed through an additional supply pipe connecting the housing body 31 to an external water supply source.

Since water supplied to the housing body 31 in the water supply operation may be introduced to the storage body 41 through the through holes 43 of the storage body 41, when water is supplied to the housing body 31, garbage is rearranged in the storage body 41, and thus the unbalanced state is resolved. At this point, the above agitating operation may be concurrently performed during the water supply operation.

Although the above detection operation S4 has been described as performing only an UB detection operation, e.g., first detection operation, of detecting unbalance of the storage body 41, the detection operation S4 included in the method may further include a load detection operation, e.g., second detection operation, of determining an amount of garbage contained in the storage body 41 in addition to the first detection operation.

Determining an amount of garbage contained in the storage body 41 in the second detection operation enables the first RPM determined in the dehydration operation S6 to be increased in proportion to the amount of garbage, thus shortening dehydration time.

When an amount of garbage is determined in the second detection operation, the dehydration period of time determined in the dehydration operation S6 may be increased in proportion to an amount of garbage so as to ensure complete dehydration of garbage.

Furthermore, when an amount of garbage is determined in the second detection operation, output, e.g., amount of heat generation, of the heater 735 may be increased in proportion to an amount of garbage in a drying operation (S8) that will be described in more detail below or an execution time, e.g., drying time, of the drying operation S8 may be increased in proportion to an amount of garbage, thus ensuring shortening of a drying time and complete drying of garbage.

The second detection operation included in the method may be performed in such a manner as to measure a period of time from the time when power supply to the driving unit 8 which is rotating the dehydration unit 4 and the agitation unit 5 at the second RPM is interrupted until rotation of the dehydration unit 4 and the agitation unit 5 are halted.

As an amount of garbage contained in the storage body 41 is increased, a period of time required until the storage body 41 and the agitation unit 5 which are rotating at the second RPM are stopped will be increased.

Accordingly, if a period of time required from the time when the control unit interrupts power supply to the driving unit 8 until the storage body 41 which is rotating at the second RPM is stopped can be compared with a period of time required from the time of the interruption until the storage body 41 which is rotating at the second RPM is stopped in accordance with an amount of garbage, the control unit will be capable of determining the amount of garbage contained in the storage body 41.

When the detection operation S4 include the first detection operation and the second detection operation, the method sequentially performs the first detection operation and the second detection operation. When the detection operation S4 is completed by termination of the second detection operation, the operation S51 of performing at least one of the water supply operation and the agitating operation is performed depending on the result in the detection operation S5.

When it is determined that unbalance of the storage body 41 is resolved, the method performs the dehydration operation (S6 and S7) of concurrently rotating the storage body 41 and the agitation unit 5 so as to maintain the state in which the communication hole 42 is shut by the door 55 of the agitation unit.

The rotational frequency, e.g., the first RPM, of the storage body and the dehydration reference time which are set the dehydration operation (S6 and S7) may be set to a fixed value regardless of an amount of garbage contained in the storage body 41, or may be set to increase in proportion to the amount of garbage measured in the second detection operation as described above.

In some implementations, the dehydration reference time may be determined in such a way that the control unit sets dehydration time data in accordance with a current amount of garbage contained in the storage body 41 as the dehydration reference time, among a plurality of dehydration time data that may be stored in the control unit or an additional storage and sorted by amount of garbage.

When a period of time, e.g., dehydration time for which the storage body 41 and the agitation unit 5 are rotated reaches the reference time (S7), the method performs the drying operation (S8 and S81) of drying garbage contained in the storage body 41.

The drying operation (S8 and S81) may include only an operation of supplying hot air to the inside of the housing body 31 through the drying unit 73 by the control unit, or may further include an operation of rotating only the agitation unit 5 in addition to the hot air supply operation, e.g., drying and agitating operation.

When the dehydration operation (S8 and S81) includes the drying and agitating operation, the method performs the dehydration operation (S8 and S81) after the operation of controlling a position of the dehydration unit 4 to cause the communication hole 42 of the storage body to communicate with the inlet port 33 of the housing body.

Therefore, it is possible to prevent garbage contained in the storage body 41 from being discharged to the housing body 31 during the drying and agitating operation. In other words, the drying and agitating operation includes the operation of controlling a position of the communication hole (e.g., S11, S13, and S15), the operation of rotating only the agitation unit, and the operation of controlling a position of the door to shut the communication hole 42 by the door 55 upon stopping of rotation of the agitation unit (e.g., S33 and S35).

The drying and agitating operation may be continuously performed for a period of time, e.g., drying reference time, for which hot air is supplied to the housing body 31, or may be repeatedly performed a number of times for the drying reference time.

The drying reference time that is set in the drying operation may be preset to a fixed value regardless of an amount of garbage, or may be set to increase in proportion to an amount of garbage measured in the second detection operation.

In the latter case, the dehydration reference time may be determined in such a way that the control unit sets dehydration time data in accordance with a current amount of garbage contained in the storage body 41 as the dehydration reference time, among a plurality of dehydration time data that may be stored in the control unit or an additional storage and sorted by amount of garbage.

The drying operation is terminated when a period of time, e.g., drying time for which hot air is supplied to garbage (S81) reaches the drying reference time. When the drying operation is terminated, the method performs a garbage discharge operation S9 of discharging garbage contained in the storage body 41 to the drawer 6.

Figure 12:
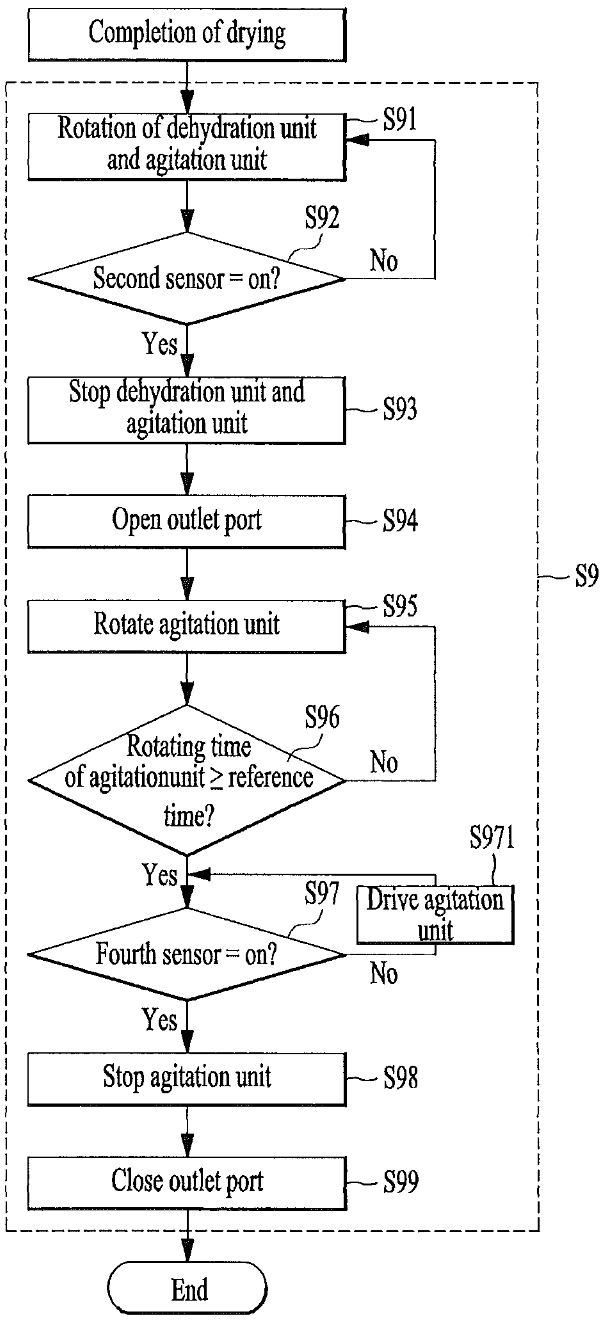
FIG. 12 is a flowchart of an example discharge operation of a garbage disposal unit.

As shown in FIG. 12, the garbage discharge operation S9 may include a second connection operation (S91, S92, and S93) of connecting the communication hole 42 to the outlet port 35 of the housing 3 by rotating the dehydration unit 4, a outlet port opening operation S94 of opening the outlet port 35 by controlling the housing door 37, and a discharge operation (S95 and S96) of discharging garbage contained in the storage body 41 to the outside of the storage body 41 by rotating only the agitation unit 5.

The second connection operation includes an operation of concurrently rotating the agitation unit 5 and the dehydration unit 4 by rotating the agitator rotating shaft 53 by the driving unit 8 (S91), and an operation of halting rotation of the dehydration unit and the agitation unit when the communication hole 42 of the dehydration unit reaches a position corresponding to the outlet port 35 of the housing (S92 and S93).

An operation S92 of determining whether the communication hole 42 reaches the position corresponding to the outlet port 35 is performed in such a way as to determine whether the second sensor 96 detects magnetic force of the first magnetic member 92.

Since the first magnetic member 92 is fixed to the rotating shaft 47 of the dehydration unit to be parallel to the communication hole 42 and the second sensor 96 is provided at the housing 3 to be parallel to the outlet port 35, the control unit can recognize that the communication hole 42 is positioned over the outlet port 35 when the second sensor 96 detects magnetic force of the first magnetic member 92.

When it is determined that the communication hole 42 is positioned over the outlet port 35, the control unit stops operation of the driving unit 8 to halt rotation of the dehydration unit 4 and the agitation unit 5 (S93).

When the second connection operation is completed, the outlet port opening operation S94 of opening the outlet port 35 of the housing by the housing door 37 is performed. Here, the outlet opening operation S94 may be performed prior to the second connection operation (S91, S92, and S93).

When the outlet port opening operation S94 is completed, the discharge operation (S95 and S96) in which the control unit changes a rotational direction of the driving unit 8 to the second direction and rotates only the agitation unit 5 for a predetermined period of time is performed.

When the discharge operation (S95 and S96) is performed for the predetermined period of time, garbage contained in the storage body 41 is discharged to the drawer 6 through the communication hole 42 and the outlet port 35 by the agitation unit 5. At this time, the rotational relationship among the housing 3, the dehydration unit 4 and the agitation unit 5 is as shown in FIG. 5(*c*). Upon completion of the discharge operation (S95 and S96), the method may be terminated.

The method may further include, after completion of the discharge operation (S95 and S96), an operation of closing the communication hole 42 by the door 55 (S97 and S08) and an operation of closing the outlet port 35 by the housing door 37 (S99).

When the second position detector included in the garbage disposal unit includes only the second magnetic member 95 and the third sensor 97, the communication hole closing operation may include an operation of concurrently rotating the dehydration unit 4 and the agitation unit 5 until the first sensor 94 detects magnetic force of the first magnetic member 92, e.g., until the communication hole 42 reaches a position at which the communication hole 42 communicates with the inlet port 33, and an operation of rotating only the agitation unit 5 until the third sensor 97 detects magnetic force of the second magnetic member 95.

Meanwhile, when the second position detector included in the garbage disposal unit further includes a fourth sensor 99 (see FIG. 9) fixed to the housing body 31 and angularly spaced apart from the third sensor 97 by an angle of 180°, the communication hole closing operation may include the operation (S97, S971, and S98) of rotating only the agitation unit until the fourth sensor 99 detects magnetic force of the second magnetic member 95.

The second magnetic member 95 and the third sensor 97 are disposed at positions at which it is possible to determine whether the communication hole 42 is closed by the door 55. Accordingly, when the fourth sensor 99 is angularly spaced apart from the third sensor 97 by an angle of 180°, the door 44 will be positioned over the outlet port 35 when the fourth sensor 99 detects the second magnetic member 95.

Therefore, after completion of the discharge operation (S95 and S96), the communication hole 42, which has been positioned to communicate with the outlet port 35, is closed by the door 55 when the fourth sensor 99 detects magnetic force of the second magnetic member 95.

The operation S99 of closing the outlet port is intended to cause water, introduced to the housing 3 through the sink outlet D of the sink cabinet, to flow not into the drawer 6 but into the discharge duct 71 through second communication part 313.

The operation S99 of closing the outlet port 35 may be performed concurrently with or prior to the operation S97 of closing the communication hole 42 by the door 55.

Figure 13:
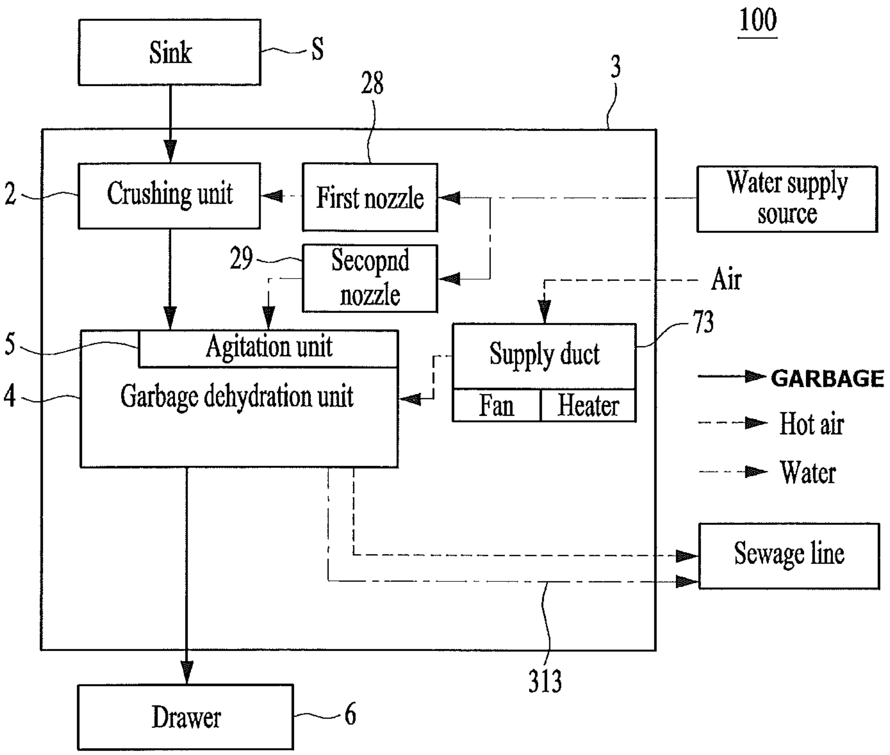
FIG. 13 is a schematic view of an example garbage disposal unit.

FIG. 13 illustrates an example garbage disposal unit.

The garbage disposal unit 100 includes a housing 3 serving not only to provide a flow channel for guiding water discharged from a sink cabinet S to a sewage line but also to provide a space for containing garbage discharged from the sink cabinet S, a crushing unit 2 for crushing garbage discharged from the sink cabinet S, and a dehydration unit 4 rotatably provided in the housing 3 to contain garbage crushed by the crushing unit 2.

The dehydration unit 4 should include a rotatable storage body, and a communication hole provided at the storage body to allow garbage discharged from the crushing unit 2 to be introduced to the inside of the storage body.

Accordingly, the communication hole may be positioned under the crushing unit 2 depending on a rotational angle of the storage body, and the communication hole provided at the dehydration unit 4 is closed by the dehydration unit 5 rotatably provided in the storage body.

Since the agitation unit 5 is rotatably provided in the dehydration unit 4, the agitation unit 5 included in the garbage disposal unit will serve not only to open and close the communication hole but also to agitate garbage contained in the storage body.

The dehydration unit 4 and the agitation unit 5 may be rotated by a single driving unit, or may be rotated by respective driving units.

When garbage crushed by the crushing unit 2 cannot be transferred to the dehydration unit 4, foul smells may be generated during decomposition of the garbage. Accordingly, the garbage disposal unit may further include washing water nozzles 28 and 29 for spraying water to the crushing unit 2 to remove garbage from the crushing unit 2.

Water from an external water source may be supplied to the washing water nozzles 28 and 29.

Garbage contained in the dehydration unit 4 is dehydrated during rotation of the storage body. Garbage, which has been completely dehydrated, is discharged to a drawer 6, and water, which is discharged from the dehydration unit 4, is discharged through a flow channel 313 connected to a sewage line.

In order to discharge garbage contained in the dehydration unit 4 to the drawer 6, a control unit should rotate the storage body such that the communication hole is positioned over the drawer 6 and then control the storage body and the agitation unit such that the communication hole is opened by the agitation unit 5.

The garbage disposal unit may further include a drying unit for drying garbage contained in the dehydration unit 4.

The drying unit may include a supply duct 73 for supplying hot air to the dehydration unit 4, and a fan and a heater provided at the supply duct 73. The supply duct 73 may serve to supply outside air to the housing 3, or may serve to circulate air in the housing 3.

When the supply duct 73 is provided to supply outside air to the housing 3, air supplied to the dehydration unit 4 will be discharged to a sewage line through the flow channel 313 connected to the sewage line by the fan and the heater.

However, when the supply duct 73 is provided to circulate air in the housing 3, the supply duct 73 should be provided with a unit for condensing air discharged from the dehydration unit 4, in addition to the fan and the heater.

What is claimed is:

1. A garbage disposal unit comprising:
- a cabinet;
- a crushing unit that is located in the cabinet and that is configured to crush garbage;
- a housing body that is located in the cabinet;
- an inlet port that is configured to guide garbage discharged from the crushing unit to the housing body;
- an outlet port that is configured to connect an inside of the housing body to an inside of the cabinet;
- a dehydration unit that is located in the housing body and that is configured to dehydrate and agitate garbage by rotating, the dehydration unit including (i) a storage body that is located in the housing, that is configured to store garbage, and that defines a communication hole that is configured to connect with the inlet port or the outlet port based on a rotational angle of the storage body and (ii) a rotating shaft that is configured to be oriented parallel to ground upon proper installation and that is configured to rotatably support the storage body and the housing body; and
- an agitation unit that is configured to rotate in the storage body and configured to open and close the communication hole.

2. The garbage disposal unit according to claim 1, further comprising:
- a driving unit that is configured to rotate the agitation unit in a clockwise direction and a counterclockwise direction,
- wherein the dehydration unit rotates together with the agitation unit based on the agitation unit rotating in one of the clockwise direction and the counterclockwise direction.

3. The garbage disposal unit according to claim 2, wherein:
- the rotating shaft includes a shaft body that extends through the housing body, that is configured to rotate in the housing body, and that defines a shaft through hole,
- the agitation unit includes an agitator rotating shaft that is located in the shaft through hole and that is connected to the driving unit, and
- the garbage disposal unit further comprises a power transmission unit that is located in the shaft through hole, that is configured to support the agitator rotating shaft, and that is configured to transmit one of a clockwise rotational force and a counterclockwise rotational force supplied by the agitator rotating shaft to the shaft body.

4. The garbage disposal unit according to claim 3, further comprising a lock that is configured to prevent rotation of the shaft body and rotation of the dehydration unit.

5. The garbage disposal unit according to claim 4, wherein the lock comprises:

a first engaging part that is located at the shaft body; and a second engaging part that is rotatably located at the housing body and that is configured to engage with the first engaging part.

6. The garbage disposal unit according to claim 3, further comprising:

a first position detector that is configured to detect a position of the communication hole; and a second position detector that is configured to detect a position of the agitation unit.

7. The garbage disposal unit according to claim 6, wherein the first position detector comprises:

a first magnetic member that is fixed to the shaft body;

a first sensor that is configured to determine whether the communication hole communicates with the inlet port by detecting a magnetic field of the first magnetic member; and a second sensor that is configured to determine whether the communication hole communicates with the outlet port by detecting a magnetic field of the first magnetic member.

8. The garbage disposal unit according to claim 7, wherein the agitation unit further includes:

a base that is located in the storage body and that is fixed to the agitator rotating shaft, and a door that is fixed to the base, that is configured to open and close the communication hole, and that is configured to agitate garbage stored in the storage body during rotation of the base.

9. The garbage disposal unit according to claim 1, further comprising a drying unit that is configured to dry garbage in the dehydration unit by supplying air to an inside of the housing body.

10. The garbage disposal unit according to claim 9, wherein:

the storage body defines a through hole that is located through the storage body and that is configured to allow an inside of the storage body to communicate with an inside of the housing body, the drying unit includes:

a supply duct that is configured to guide air to the housing body, a heater that is located in the supply duct, a fan that is configured to supply air to the supply duct, and a discharge duct that is configured to connect an inside of the housing body with an outside of the cabinet.

11. The garbage disposal unit according to claim 1, wherein the crushing unit comprises:

a support body that includes an introduction face that is configured to receive garbage and a discharge face that is configured to discharge garbage; and a blade that is rotatably located at the support body, that is configured to crush garbage received through the introduction face, and that is configured to transfer the garbage to the discharge face.

12. The garbage disposal unit according to claim 11, further comprising a washing water nozzle that is configured to spray water into the support body.

13. The garbage disposal unit according to claim 12, wherein the washing water nozzle comprises:

a first nozzle that is fixed to the support body and that is configured to spray water in a first rectangular pyramid shape that has a first base width that is parallel to the introduction face and that has a first base length that is perpendicular to the introduction face and that is shorter than the first base width; and a second nozzle that is fixed to the support body and that is configured to spray water in a second rectangular pyramid shape that has a second base width that is parallel to the introduction face and that has a first base length that is perpendicular to the introduction face and that is longer than the second base width.

14. The garbage disposal unit according to claim 11, further comprising:

a reception part that defines a space that is configured to accommodate the blade by protruding toward the inlet port from the discharge face and that defines a discharge hole, wherein the blade is one of a pair of blades that are located in the receptor and that are configured to rotate to move garbage toward the discharge hole.

15. The garbage disposal unit according to claim 11, further comprising a gasket that is located between the discharge face and the inlet port, that is configured to attenuate vibration between the housing and the crushing unit, and that is configured to prevent water leakage between the housing and the crushing unit.

16. The garbage disposal unit according to claim 11, wherein the blade comprises:

a first blade that includes:

a first shaft that is rotatably coupled to the support body, a plurality of first cutters that are each separated from each other by predetermined intervals and that protrude from the first shaft, and a first gear that is located at the first shaft; and a second blade that includes:

a second shaft that is rotatably coupled to the support body, a plurality of second cutters that protrude from the second shaft and that are configured to pass through spaces defined by the plurality of first cutters during rotation of the first blade and the second blade, and a second gear that is located at the second shaft and that is configured to engage the first gear.

17. The garbage disposal unit according to claim 1, wherein the dehydration unit includes a guide that is configured to prevent garbage stored in the storage body from being discharged to an outside of the storage body through the communication hole during rotation of the agitation unit.

18. The garbage disposal unit according to claim 17, wherein the guide comprises:

a first guide that protrudes from the communication hole toward a rotational center of the storage body; and a second guide that protrudes from the communication hole away from the rotational center of the storage body.

19. The garbage disposal unit according to claim 18, wherein:

the rotating shaft includes a shaft body that extends through the housing body, that is configured to rotate in the housing body, and that defines a shaft through hole, the agitation unit includes an agitator rotating shaft that is located in the shaft through hole and that is connected to the driving unit, the garbage disposal unit further comprises a power transmission unit that is located in the shaft through hole, that is configured to support the agitator rotating shaft, and that is configured to transmit one of a clockwise rotational force and a counterclockwise rotational force to the shaft body, and the agitation unit includes:

a base that is located in the storage body and that is fixed to the rotating shaft of the agitation unit, a door that is fixed to the base, that is configured to open and close the communication hole, and that is configured to agitate garbage stored in the storage body during rotation of the base, and a scraper that is configured to protrude from the door and that is configured to contact an inner surface of the storage body.

20. The garbage disposal unit according to claim 1, further comprising:

a housing door that is located at the housing body and that is configured to selectively open and close the outlet port;

a drawer that is located in the cabinet and that defines a space for storing garbage discharged from the outlet port; and a discharge duct that is configured to connect an inside of the housing body to communicate with an outside of the cabinet.

21. The garbage disposal unit according to claim 20, wherein the drawer is retractably located in the cabinet.

* * * * *